United States Patent Office 3,131,217
Patented Apr. 28, 1964

3,131,217
UNSATURATED COMPOUNDS CONTAINING THE PENTAFLUOROTHIO GROUP
Neil Hunter Ray, Northwich, England, assignor to Imperial Chemical Industries Limited, London, England, a corporation of Great Britain
No Drawing. Filed Nov. 7, 1960, Ser. No. 67,525
Claims priority, application Great Britain Nov. 24, 1959
6 Claims. (Cl. 260—543)

This invention relates to novel unsaturated organic compounds containing the pentafluorothio group —$SF_5$ and to a method of making them.

It is well known in organic chemistry to make unsaturated compounds containing the C=C group by removal of the elements of a halogen acid from a saturated compound by means of alcoholic or aqueous alcoholic solutions of caustic potash or caustic soda, where the halogen is chlorine, bromine or iodine. This process is not readily applicable to fluorinated compounds, for one reason because it is usually not possible to obtain the necessary intermediate compound containing the proper number of fluorine atoms.

In co-pending application of Ray et al., Serial No. 52,037, filed August 26, 1960, now Patent No. 3,086,048, we have described a method for preparing compounds having the general formula

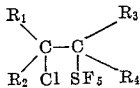

by adding sulphur chloride pentafluoride, $SF_5Cl$, across the double bond of an olefine or other non-aromatic compound containing the ethylenically unsaturated group >C=C<. In this formula $R_1$, $R_2$, $R_3$ and $R_4$ may represent hydrogen, alkyl or aryl groups. Since sulphur chloride pentafluoride is very readily hydrolysed by alkali it was expected that compounds having this general formula would on treatment with alcoholic or aqueous alcoholic caustic potash or caustic soda lose all the —$SF_5$ group. For example we should have expected $CH_2Cl$—$CH_2SF_5$, obtained by adding $SF_5Cl$ to ethylene to yield vinyl chloride, potassium sulphate and potassium fluoride on treatment with caustic potash. Surprisingly we have found that under such conditions the —$SF_5$ group is not attacked but instead the elements of hydrochloric acid are removed and new unsaturated compounds containing the —$SF_5$ group are formed.

According to my invention I provide new unsaturated organic compounds containing the pentafluorothio group —$SF_5$, and a process for making them comprising removing the elements of hydrogen chloride from the addition products obtained by adding sulphur chloride pentafluoride to olefines and other non-aromatic ethylenically unsaturated compounds, said addition products having the general formula

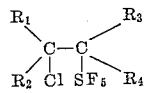

in which $R_1$, $R_2$, etc. may represent halogen and hydrogen atoms, alkyl and aryl groups some of which may be joined in a ring structure.

The new compounds of my invention have structures of the general types represented by

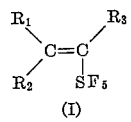
(I)

and

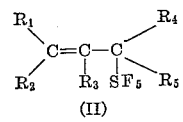
(II)

where $R_1$, $R_2$, etc. may be hydrogen, halogen, alkyl or aryl groups, and may be joined in a ring structure. The structure-type depends on which carbon atom of the sulphur chloride pentafluoride/olefine addition product loses a hydrogen atom in the dehydrochlorination. For example, if in the addition product only hydrogen, or hydrogen and halogen atoms are attached to the two carbon atoms of the original ethylenic bond the new compounds are of type I. Thus ethylene gives the addition product 2-chloroethyl sulphur pentafluoride $CH_2Cl$—$CH_2SF_5$ which then gives the new compound vinyl sulphur pentafluoride $CH_2$=$CH.SF_5$. Likewise cyclohexene gives first 1-chlorocyclohexyl sulphur pentafluoride

which then gives cyclohexenyl sulphur pentafluoride on dehydrochlorination

Vinyl chloride gives the additive product 2,2-dichloroethyl sulphur pentafluoride $CHCl_2$—$CH_2.SF_5$ which by dehydrochlorination gives 2-chlorovinyl sulphur pentafluoride $CHCl$=$CH.SF_5$, and likewise trifluoroethylene gives 1H.2-chlorotrifluoroethyl sulphur pentafluoride

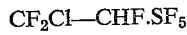
$CF_2Cl$—$CHF.SF_5$ from which perfluorovinyl sulphur pentafluoride

$CF_2$=$CF.SF_5$ is made by dehydrochlorination.

On the other hand, if in the sulphur chloride pentafluoride/olefine addition product one or more alkyl groups is attached to either or both of the carbon atoms of the original ethylenic bond the hydrogen atom lost in the dehydrochlorination may come from a carbon atom in the α position to the original ethylenic carbon atoms and then new compounds of type II will be formed. For example, propylene gives the addition product 2-chloropropyl sulphur pentafluoride $CH_3.CHCl.CH_2.SF_5$ which on dehydrochlorination gives allyl sulphur pentafluoride $CH_2$=$CH.CH_2.SF_5$ as well as propenyl sulphur pentafluoride $CH_3$—$CH$=$CH.SF_5$.

The method of making the new compounds is essentially to reflux the olefine/sulphur chloride pentafluoride addition compounds with an alcoholic or aqueous-alcoholic solution of caustic soda or caustic potash containing 10–25% of the latter for half an hour or more. A suspension of finely divided caustic potash in a non-aqueous inert organic solvent, for example petroleum ether, may be used if desired in place of the solution. The reflux condenser exit may be connected to a cold trap if the more volatile compounds are being made. For the less volatile compounds the reaction mixture after refluxing may be poured into water and the product extracted with ether and the extract distilled.

The new compounds are reactive intermediates for introducing $-SF_5$ groups into other molecules and are also monomers for polymerization and copolymerization. For example vinyl sulphur pentafluoride copolymerizes with ethylene, and with vinyl chloride. The copolymers with ethylene, for example 1:6 and 1:3 moles vinyl sulphur pentafluoride/moles ethylene, are more flexible and more transparent than normal polythene.

The following examples illustrate but do not limit the invention.

*Example 1*

Potassium hydroxide (19 g.) was dissolved in water (20 cc.) and alcohol (60 cc.) was added. This solution was boiled under a reflux condenser to the top of which was connected a trap cooled in a solid carbon dioxide/alcohol freezing mixture. While the solution was boiling, 2-chloroethyl sulphur pentafluoride (33 g.; prepared from ethylene and sulphur chloride pentafluoride as described in co-pending application No. 31,208/59) was added gradually during ½ hour. The solution was boiled for a further hour after all the reagent had been added. During this period the reflux condenser was heated to 40° C. by warm water. About 15 cc. of a volatile liquid collected in the cold trap. This was distilled, collecting the fraction of boiling point 40–42° C., which amounted to 20 g. (80% theoretical); the product was shown to be vinyl sulphur pentafluoride as follows:

Elementary analysis gave C 15.9; H 2.0; F 61.3; S 21.0%. $C_2H_3SF_5$ requires C 15.6; H 2.0; F 61.6; S 20.9%. The molecular weight was found to be 153 (required 154) and the infra-red absorption spectrum showed an intense band at 870 cm.$^{-1}$ characteristic of the $-SF_5$ group, and strong bands at 965, 1040 and 1390 cm.$^{-1}$. The latent heat of evaporation was 6800 cal. per mole and the Trouton constant 21.6.

*Example 2*

A mixture of 1-chlorocyclohexyl sulphur pentafluoride (12.2 g.), prepared from cyclohexene and sulphur chloride pentafluoride, potassium hydroxide (5.6 g.), water (5 cc.) and ethanol (75 cc.) in a 250 cc. flask with a reflux condenser was cautiously warmed to about 75° C., and as soon as the reaction started the heating was stopped. When the initial exothermic reaction was over the mixture was heated to boiling for 15 minutes then cooled and poured into water (350 cc.). The lower layer was separated, dried over anhydrous magnesium sulphate and distilled to give at 112°–115° C./100 mms. Hg 8 g. (79% theoretical) of cyclohexenyl sulphur pentafluoride. This had a boiling point under 760 mm. Hg of 161° C., a refractive index $n_D^{20}$ of 1.4282, and a molecular weight of 190 ($C_6H_9F_5S$ requires 208). Elementary analysis gave C 34.9; H 4.7; F 44.2; S 15.3%. $C_6H_9F_5S$ requires C 34.6; H 4.3; F 45.6; S 15.4%. The product showed an intense infra-red absorption band at 870 cm.$^{-1}$ characteristic of the $-SF_5$ group and a band at 940 cm.$^{-1}$ indicating unsaturation.

*Example 3*

A mixture of potassium hydroxide (75 g.), methanol (300 cc.), and 2-chloropropyl sulphur pentafluoride (145 g.) was heated under reflux for 2½ hr., then allowed to cool and left to stand at room temperature for 12 hr. The mixture was added to 1 litre of water and the lower layer was separated, washed with water, and dried over anhydrous magnesium sulphate. A Beilstein test showed that chlorine was absent. The liquid was fractionally distilled, giving a main fraction (43 g.), B.P. 80–82°, and a higher-boiling residue which was not examined. The main fraction was separated by gas chromatagraphy into two components; that of shorter retention time (4.4 g.) was allyl sulphur pentafluoride (found: C 21.7; H 3.0; F 54.3; S 19.0; molecular weight 168. $C_3H_6F_5S$ requires C 21.4; H 3.0; F 56.5; S 19.0%, molecular weight 168). The second and larger fraction (38.5 g.) was propenyl sulphur pentafluoride (found: C 22.0; H 2.7; F 54.3; S 19.1; molecular weight 170). The infra-red absorption spectra of both these compounds showed bands at 602, 606, 613 and 85 cm.$^{-1}$ characteristic of the $-SF_5$ group; propenyl sulphur pentafluoride also showed absorptions at 1449, 2865 and 2967 cm.$^{-1}$ indicating the presence of a methyl group; allyl sulphur pentafluoride showed absorptions at 995 and 3090 cm.$^{-1}$ indicating the presence of a vinyl group.

*Example 4*

2,2-dichloroethyl sulphur pentafluoride (23 g.) was dissolved in methanol (25 cc.) and cooled to −20° C. A solution of potassium hydroxide (9 g.) in methanol (30 cc.) was added in portions, keeping the temperature between −20° and −10°. The mixture was filtered, and water (50 cc.) was added to the filtrate. The lower layer was separated, washed with a saturated solution of sodium chloride, dried over anhydrous magnesium sulphate and distilled, giving 2-chlorovinyl sulphur pentafluoride (12 g., 63% theory), B.P. 66°. (Found: C 11.9; H 1.2; Cl 19.5; F 49.8; S 17.5; molecular weight 185. $C_2H_2ClF_5S$ requires C 12.7; H 1.1; Cl 18.8; F 50.4; S 17.0%; molecular weight 189.) Its infra-red absorption spectrum showed an intense band at 870 cm.$^{-1}$ characteristic of the $-SF_5$ group, and strong bands at 920 and 1580 cm.$^{-1}$ indicating unsaturation.

*Example 5*

A round-bottomed three-necked flask (250 cc.) was fitted with a dropping funnel, a stopper and a reflux condenser the top of which was connected to a trap cooled to −80° C. Petroleum ether, B.P. 100°–120° C. (100 cc.), and a mixture of carbon tetrachloride (30 g.) and 1H,2-chlorotrifluoroethyl sulphur pentafluoride (18 g.) (made by addition of sulphur chloride pentafluoride to trifluoroethylene) were added and brought to gentle reflux. Finely powdered potassium hydroxide (18 g.) was added through the stoppered opening over a period of 3½ hours after which the reaction appeared to be complete. A colourless liquid (17.5 g.) collected in the cold trap and was shown by gas chromatography to be a single substance which was identified as perfluorovinyl sulphur pentafluoride $CF_2=CF.SF_5$. Analysis gave C 11.2; F 72.8; S 15.2%; and a molecular weight determination gave 206. Required for $C_2F_8S$ are C 11.5; F 73.1; S 15.4%, and a molecular weight of 208. The vapour pressure of the compound fitted the equation $$\log_{10} p = 6.36 - 1310/T$$

and the boiling point by extrapolation was 19° C. and the latent heat of evaporation calculated from the slope of the curve was 5990 cals./mole, and the Trouton constant 20.5. The infra-red absorption spectrum showed intense bands at 1390, 1050, 870 cm.$^{-1}$.

What I claim is:

1. An unsaturated organic compound selected from the group consisting of vinyl sulfur pentafluoride, 2-chlorovinyl sulfur pentafluoride, perfluorovinyl sulfur pentafluoride, 2-methylvinyl sulfur pentafluoride, cyclohexenyl sulfur pentafluoride and allyl sulfur pentafluoride.

2. Vinyl sulphur pentafluoride $CH_2=CH.SF_5$.

3. 2-chlorovinyl sulphur pentafluoride $CHCl=CH.SF_5$.

4. Perfluorovinyl sulphur pentafluoride $CF_2=CF.SF_5$.
5. 2-methylvinyl sulphur pentafluoride $$CH_3.CH=CH.SF_5$$

6. Cyclohexenyl sulphur pentafluoride $C_6H_9.SF_5$.

References Cited in the file of this patent

FOREIGN PATENTS 895,452   Germany _____ Nov. 2, 1953

OTHER REFERENCES

Hoffman et al.: J.A.C.S., volume 79, pp. 3424–3429 (1957).

Wagner et al.: "Synthetic Organic Chemistry," pp. 35–38 (1953).

Lovelace et al.: "Aliphatic Fluorine Compounds," p. 336 (1958).

(Copies of above in Patent Office Scientific Library.)

Case et al.: J. Chem. Soc. (London), May 1961, pp. 2066–2075.